United States Patent
Lin et al.

(10) Patent No.: US 8,025,820 B2
(45) Date of Patent: Sep. 27, 2011

(54) METHOD OF MANUFACTURING MICROLENS

(75) Inventors: Che-Hsin Lin, Kaohsiung (TW); Shu-Ming Kuo, Tainan (TW)

(73) Assignee: National Sun Yat-Sen University, Kaohsiung (TW)

( * ) Notice: Subject to any disclaimer, the term of this patent is extended or adjusted under 35 U.S.C. 154(b) by 147 days.

(21) Appl. No.: 12/418,263

(22) Filed: Apr. 3, 2009

(65) Prior Publication Data

US 2009/0308525 A1 Dec. 17, 2009

(30) Foreign Application Priority Data

Jun. 16, 2008 (TW) .............................. 97122450 A (51) Int. Cl.
*B29D 11/00* (2006.01)
(52) U.S. Cl. ............................ 264/1.36; 264/1.7; 264/2.5
(58) Field of Classification Search .................. 264/1.36, 264/1.38, 1.7, 2.5, 2.6; 425/810
See application file for complete search history.

(56) References Cited

U.S. PATENT DOCUMENTS

| 5,298,366 A | 3/1994 | Iwasaki et al. |
| 2003/0207484 A1 | 11/2003 | Nishikawa |
| 2008/0006604 A1 | 1/2008 | Keady |
| 2008/0017807 A1 | 1/2008 | Nagae et al. |
| 2008/0019015 A1 | 1/2008 | Fernandez et al. |
| 2008/0049291 A1 | 2/2008 | Baek et al. |
| 2008/0080057 A1 | 4/2008 | Yamamura |
| 2008/0166155 A1 | 7/2008 | Funamoto |
| 2008/0297911 A1 | 12/2008 | Christenson et al. |
| 2009/0027778 A1 | 1/2009 | Wu et al. |

FOREIGN PATENT DOCUMENTS

| TW | 463058 | 11/2001 |
| TW | I289683 | 11/2007 |

*Primary Examiner* — Mathieu D. Vargot
(74) *Attorney, Agent, or Firm* — Muncy, Geissler, Olds & Lowe, PLLC (57) ABSTRACT

A method for manufacturing microlens comprises the steps of: coating a photosensitive polymer onto a first substrate to form a polymer film having a first surface in contact with the first substrate and a second surface; heating the polymer film; exposing the second surface of the polymer film to form a mold layer with at least one through hole; pressing and abutting the mold layer onto a second substrate and heating the photosensitive polymer within the mold layer to a temperature higher than a glass transition temperature of the photosensitive polymer for the photosensitive polymer to be melted and flow through the at least one through hole, attach onto the second substrate, and form at least one microlens on a surface of the second substrate; and performing an exposure to the at least one microlens and solidifying the at least one microlens.

11 Claims, 12 Drawing Sheets

METHOD OF MANUFACTURING MICROLENS

BACKGROUND OF THE INVENTION

1. Field of the Invention

This invention relates to a method of manufacturing a microlens, more particularly to a method of manufacturing a microlens array.

2. Description of the Related Art

Since microlens arrays are used extensively in optoelectronic industries for applications related to flat panel display, optical communication coupling, and near-field optical storage technologies, the microlens array manufacturing technology has become one of the major industrial developments.

A conventional method of manufacturing a microlens array is disclosed in R.O.C. Publication No. 463058 entitled "Batch production of sphere microlens array," and comprises the steps of: coating a first polymer onto a substrate; coating a second polymer onto the first polymer, wherein the first polymer has a glass transition temperature (Tg) greater than that of the second polymer; processing the first polymer and the second polymer by yellow light lithography to form two identical patterns on the first polymer and the second polymer; heating the substrate to a working temperature, wherein the working temperature is higher than the glass transition temperature of the second polymer and lower than the glass transition temperature of the first polymer for performing a reflow of the second polymer; maintaining the working temperature to adjust the appearance of the second polymer through a surface tension of the second polymer until the second polymer forms the shapes of sphere microlenses; and finally performing a cooling process to fixedly form the sphere microlenses. U.S. Pat. No. 5,298,366 for a "Method for Producing a Microlens Array" also implements a similar way of obtaining a microlens array.

Another conventional method of manufacturing a microlens array is disclosed in R.O.C. Pat. No. I289683 entitled "Manufacturing method of microlens arrays," and comprises the steps of providing a mold layer with a plurality of grooves, a resin and a substrate; performing a material feeding process to feed the resin into the plurality of grooves of the mold layer; performing a transfer process to transfer the resin in the plurality of grooves onto the substrate, wherein the surface tension of the resin on the substrate forms a structure with a curved surface; and finally performing a solidification process to solidify the resin with the curved surface on the substrate and form the microlens array.

In general, the aforementioned conventional method of manufacturing a microlens array has the following drawbacks. The manufacturing processes disclosed in R.O.C. Pat. No. 463058 and U.S. Pat. No. 5,298,366 both require repeated exposures and photoresist removals over the substrate, and thus cannot manufacture microlenses in mass production continuously. The manufacturing efficiency is therefore very low. The manufacturing method still uses a developer used in the yellow light lithography for removing an unnecessary portion of the photoresist, causing a waste of the first polymer and the second polymer, and incurring a high manufacturing cost. Furthermore, the conventional manufacturing method can produce only microlenses of spherical lenses but not those of aspherical lenses with a high add-on value.

The manufacturing procedure disclosed in R.O.C. Pat. No. I289683 requires a step of turning the plurality of grooves of the mold layer upward to perform the material feeding procedure each time after the transfer procedure is completed. Such requirement reduces the overall efficiency of manufacturing the microlens substantially and increases inconvenience in the use of the mold layer. In addition, the conventional manufacturing method requires a LIGA electrocasting or laser etching method to manufacture the mold layer having the plurality of grooves in advance, and thus leads to inconvenience to the manufacture of the microlens. Both of the above-mentioned drawbacks increase the productions costs.

Moreover, regarding lens deformation caused by electric field, a method is disclosed in a US Pub. No. 2009/0027778, entitled "Deformable Optical Element, Methods of Making and Uses Thereof" A deformable optical element including an elastically deformable lens and electrical contacts directly attached to the elastically deformable lens is presented. A voltage can be applied to the electrical contacts, so as to deform the deformable optical element by forcing opposite sign charge onto the electrical contacts. However, this method can only be implemented by the fixedly attached electrical contacts for the voltage to apply to the deformable optical element, and it is obviously difficult to fixedly mount these electrical contacts onto the elastically deformable lens while the elastically deformable lens is tiny.

Obviously, the aforementioned conventional methods of manufacturing microlens arrays required improvements.

SUMMARY OF THE INVENTION

The objective of this invention is to provide a method of manufacturing a microlens that directly forms a mold layer by exposure, wherein a surface exposure procedure is performed to a polymer film for exposing and solidifying a portion of a surface of the polymer film to form the mold layer and a polymer transprint ink in an internal unexposed area. The mold layer is used as a transprint mold for carrying out a microlens transprint procedure at a later stage, so as to achieve the effects of enhancing the manufacturing convenience and lowering the manufacturing cost.

Another objective of the present invention is to provide a method of manufacturing a microlens, wherein the polymer film is manufactured by a photosensitive polymer, and at least one through hole formed on the mold layer allows the photosensitive polymer in the internal unexposed area to be transprinted onto a plurality of substrates successively in order to achieve the effect of enhancing the microlens manufacturing efficiency.

The method of manufacturing a microlens in accordance with the present invention comprises the steps of: coating a photosensitive polymer onto a surface of a first substrate to form a polymer film having a first surface in contact with the surface of the first substrate and a second surface; heating the polymer film; exposing the second surface of the polymer film with an exposure level not reaching the first surface to define an exposed area and an unexposed area of the polymer film, with a mold layer being formed in the exposed area and at least one through hole of the mold layer being formed in the unexposed area; pressing and abutting the mold layer onto a second substrate and heating the photosensitive polymer in the unexposed area to a temperature higher than a glass transition temperature of the photosensitive polymer for the photosensitive polymer in the unexposed area to be melted and flow through the at least one through hole, attach onto the second substrate, and form at least one microlens on a surface of the second substrate; and performing an exposure to the at least one microlens and solidifying the at least one microlens to form a finished microlens.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

To make it easier for the objective of the invention, its structure, innovative features, and performance to be understood, reference is made to the following preferred embodiment together with the attached drawings for the detailed description of the invention.

Figure 1:
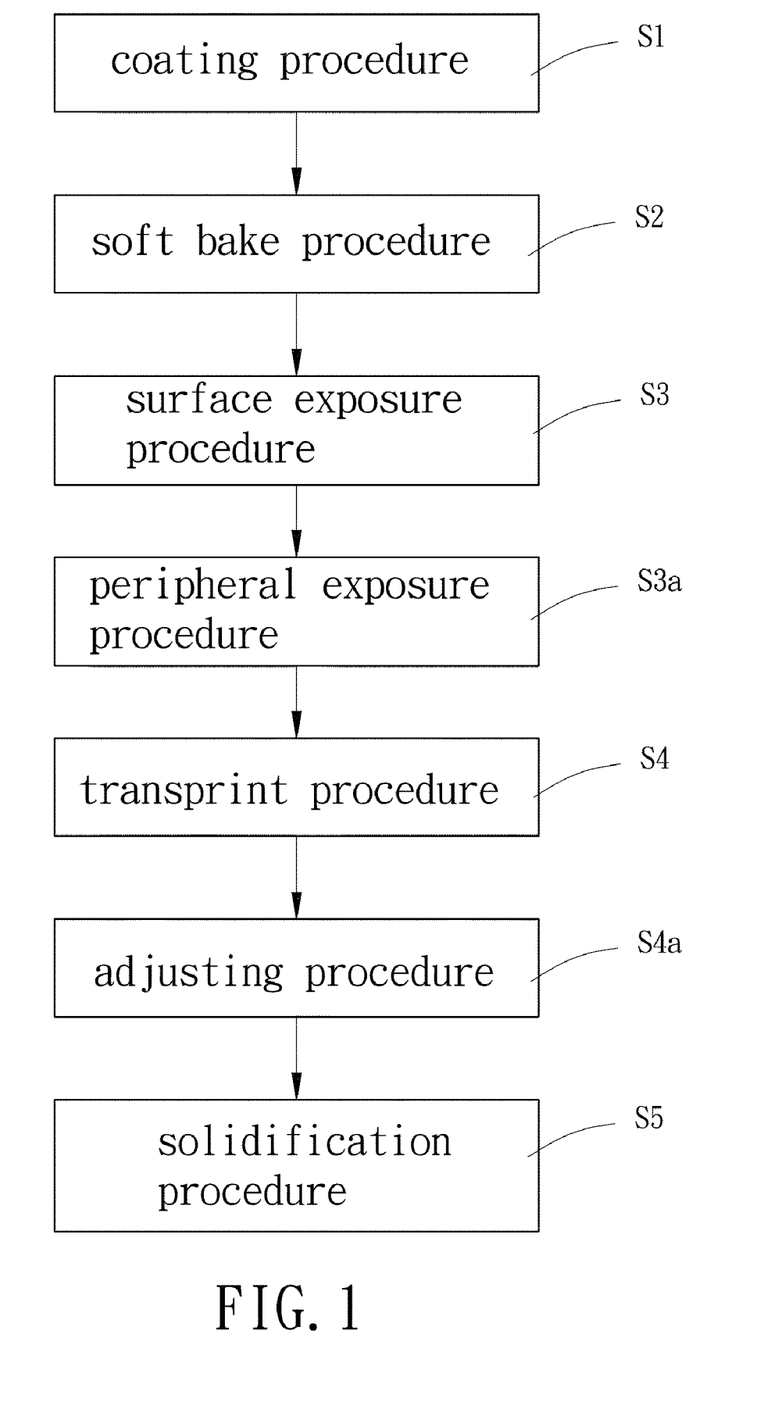
FIG. 1 is a flow chart of a method of manufacturing a microlens in accordance with the present invention.
Figure 2:
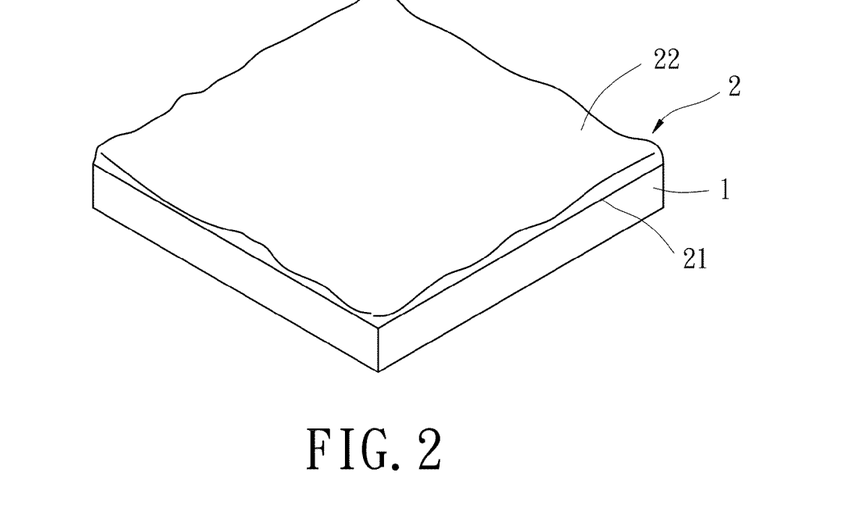
FIG. 2 is a schematic perspective view of a coating procedure in accordance with the present invention.

With reference to FIGS. 1 and 2, a coating procedure 51 is performed firstly. The photosensitive polymer is coated onto a surface of a first substrate 1 to form a polymer film 2, wherein the polymer film 2 has a first surface 21 and a second surface 22, and the first surface 21 is a surface of the polymer film 2 in contact with the first substrate 1. More specifically, the first substrate 1 can be made selectively of glass or another material, and it is preferable to wash the first substrate 1 before the polymer film is coated onto the first substrate 1 to keep impure substances from remaining on the surface of the first substrate 1. Secondly, a photosensitive polymer is coated onto the first substrate 1, wherein the photosensitive polymer of this preferred embodiment is a commercial SU-8 negative photoresist, but the invention is not limited to such an arrangement only. Finally, an injection with a constant volume or any other coating method is selected to coat a liquid photosensitive polymer uniformly onto a surface of the first substrate 1 to form a polymer film 2 with a predetermined film thickness.

Since SU-8 has relatively high penetrability and refraction coefficient at the wavelength of visible light and near that of infrared, SU-8 is very suitable to be used as a material for manufacturing optical components. SU-8 is selected as the photosensitive polymer in this preferred embodiment preferably, but other photo polymer material including polymer, photosensitive matter, dilute solvent, and chemical stabilizer, such as XBH HR series, Kodak747, JSR 151N, photo curable UV adhesive or reactive curable polymer adhesive, can be used instead, and the first substrate 1 is selected from general optical glass or optical plastic (25 mm*25 mm).

Figure 3:
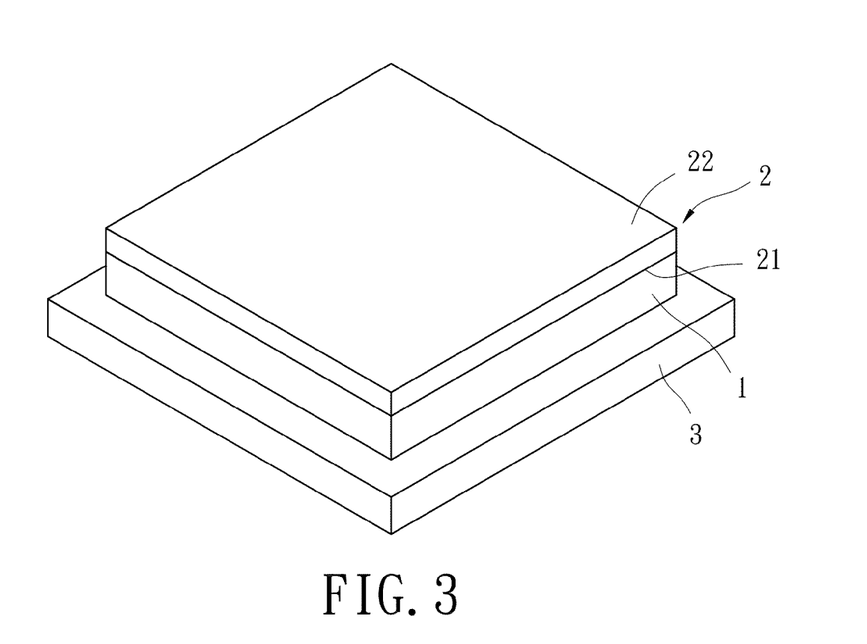
FIG. 3 is a schematic perspective view of a soft bake procedure in accordance with the present invention.
Figure 4:
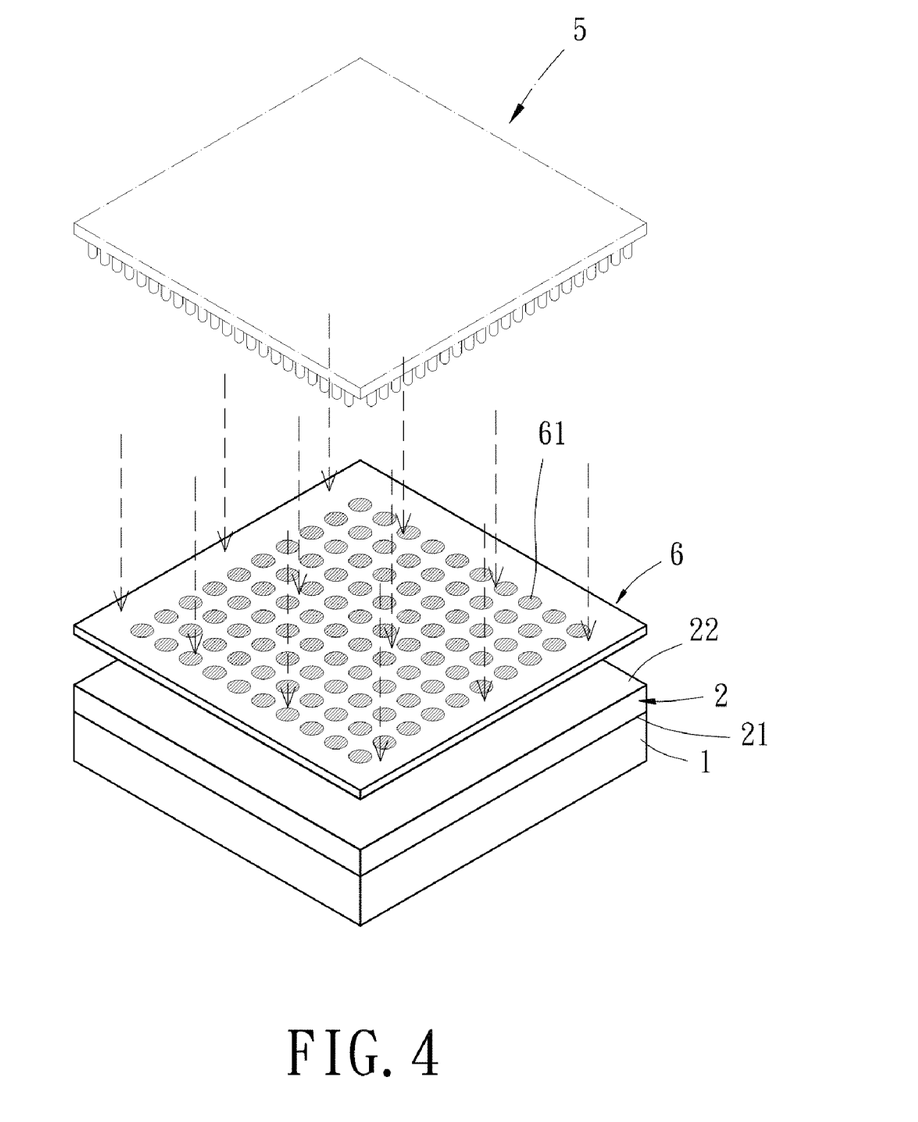
FIG. 4 is a schematic perspective view of a surface exposure procedure in accordance with the present invention.
Figure 5:
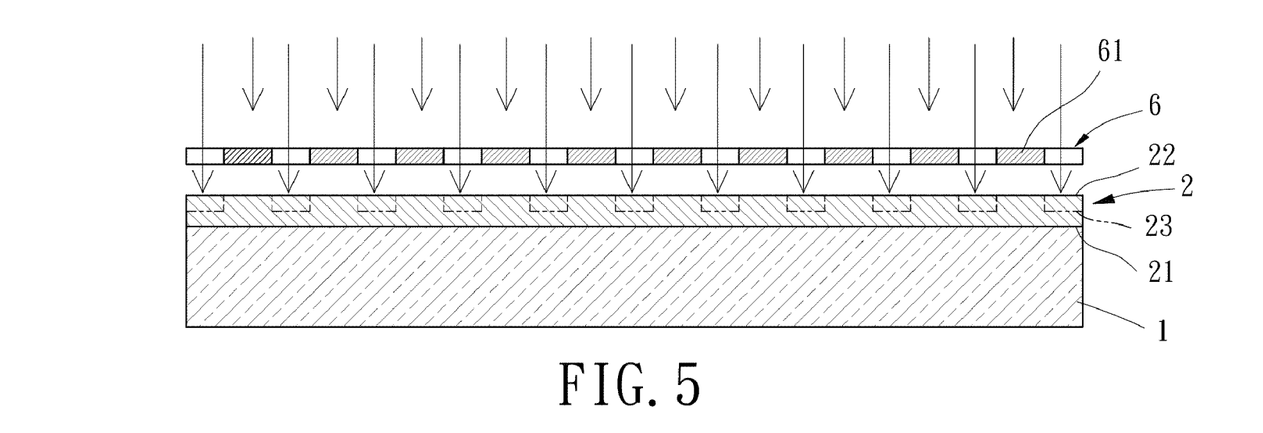
FIG. 5 is a schematic planar view of a surface exposure procedure in accordance with the present invention.
Figure 6:
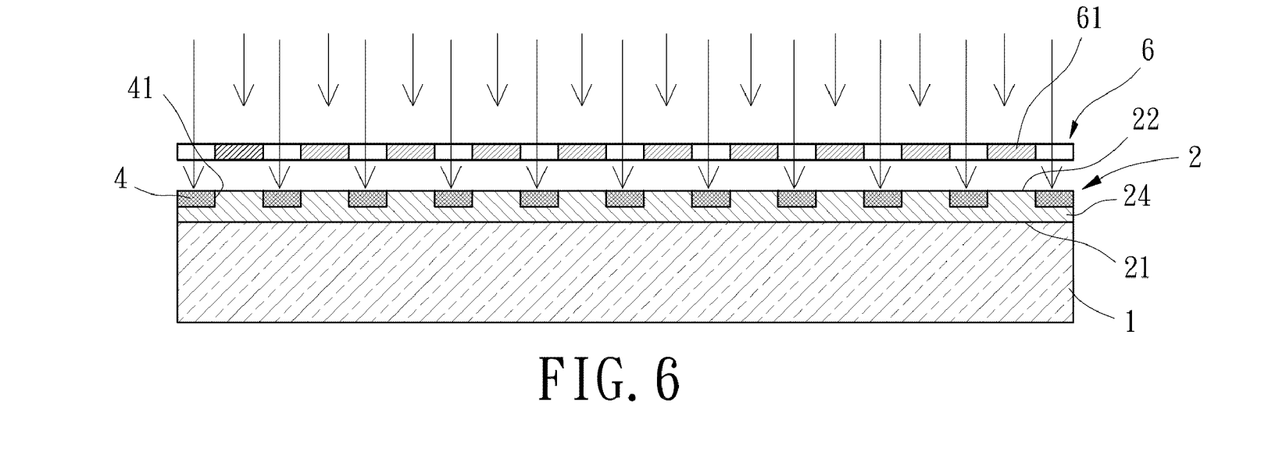
FIG. 6 is a schematic planar view of a surface exposure procedure in accordance with the present invention.

With reference to FIGS. 1 and 3, a soft bake procedure S2 is preformed, wherein the polymer film 2 is heated in a soft bake environment. More specifically, the first substrate 1 is placed on a heating plate 3 for the heating in this preferred embodiment. The ambient temperature of the soft bake environment is preferably adjusted according to properties and solvent content of the photosensitive polymer. Since the ambient temperature of the soft bake environment is preferably higher than the glass transition temperature of the photosensitive polymer, the mobility of the polymer film 2 can be increased in the soft bake procedure, and the polymer film 2 can be planarized naturally with time due to the effect of gravity to improve the degree of surface planarization of the polymer film 2. The glass transition temperature of the SU-8 is approximately equal to 55° C., and thus the polymer film 2 is heated to 70° C. and maintained at 70° C. for 5 minutes, and then up to 100° C. and maintained at 100° C. for at least one hour. Furthermore, through the soft bake procedure, a solvent in the polymer film 2 is vaporized, so that the solvent content of the polymer film 2 is controlled, and a low viscosity coefficient of the solvent in the polymer film 2, which results in a poor exposure and an excessively high mobility of the liquid polymer when the lens is formed, is prevented. After the surface of the polymer film 2 is planarized, the polymer film 2 is cooled at a predetermined speed to a temperature lower than the glass transition temperature of the photosensitive polymer, such that the polymer film 2 is turned into a solid state to facilitate the manufacturing procedure that follows. The said predetermined speed has a small temperature gradient to prevent any wrinkles or folds from being formed by uneven internal and external tensions of the polymer film 2 due to a too-quick cooling.

Figure 7:
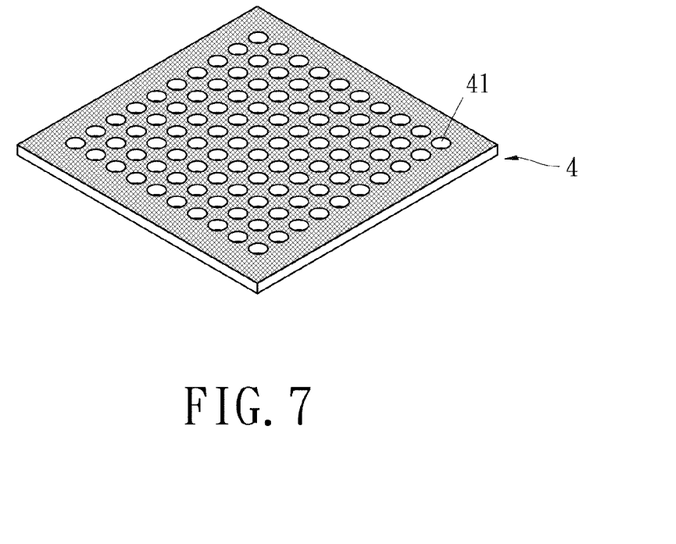
FIG. 7 is a perspective view of a mold layer in accordance with the present invention.

With reference to FIGS. 1 and 4 to 6, a surface exposure procedure S3 is performed, wherein the polymer film 2 is exposed with an exposure level not reaching the first surface 21, so that an exposed area 23 and an unexposed area 24 of the polymer film 2 is defined, and a mold layer 4 is formed after the exposed area 23 is solidified by exposure, with the mold layer 4 having a plurality of through holes 41 that are formed in the unexposed area 24. More specifically, an exposure light source 5 is projected onto a surface of the polymer film 2 through a first mask 6 having a plurality of light shielding parts 61, such that the exposed area 23 is at a position where the polymer film 2 is exposed to the exposure light source 5, and bonding is formed between photosensitive polymers in the exposed area 23 to form the mold layer 4 having a structure (as shown in FIG. 7) with a higher thermal bonding temperature. Since the polymer film 2 forms the unexposed area 24 in the light shielding area shielded by the light shielding part 61 of the first mask 6, and the light shielding part 61 is in a circular shape, the unexposed area 24 forms a plurality of through holes 41 arranged on the mold layer 4, and a diameter of each through hole 41 can be 500, 300, 200, 100 or 50 μm, but another size of the through hole 41 can be adopted as needed. When the surface exposure procedure S3 takes place, the exposure dose of the polymer film 2 is controlled to partially expose the second surface 22 of the polymer film 2, but the photosensitive polymer proximate to the first surface 21 of the polymer film 2 is not exposed. Thereby, the thickness of the mold layer 4 is controlled and smaller than the thickness of the polymer film 2. The said exposure dose is set to 1500 mJ/cm2 in this preferred embodiment with the thickness of the SU-8 polymer film equal to 500 μm, and a thickness of the mold layer 4 is preferably equal to 40% to 60% of a thickness of the polymer film 2 after the exposure takes place.

Figure 8:
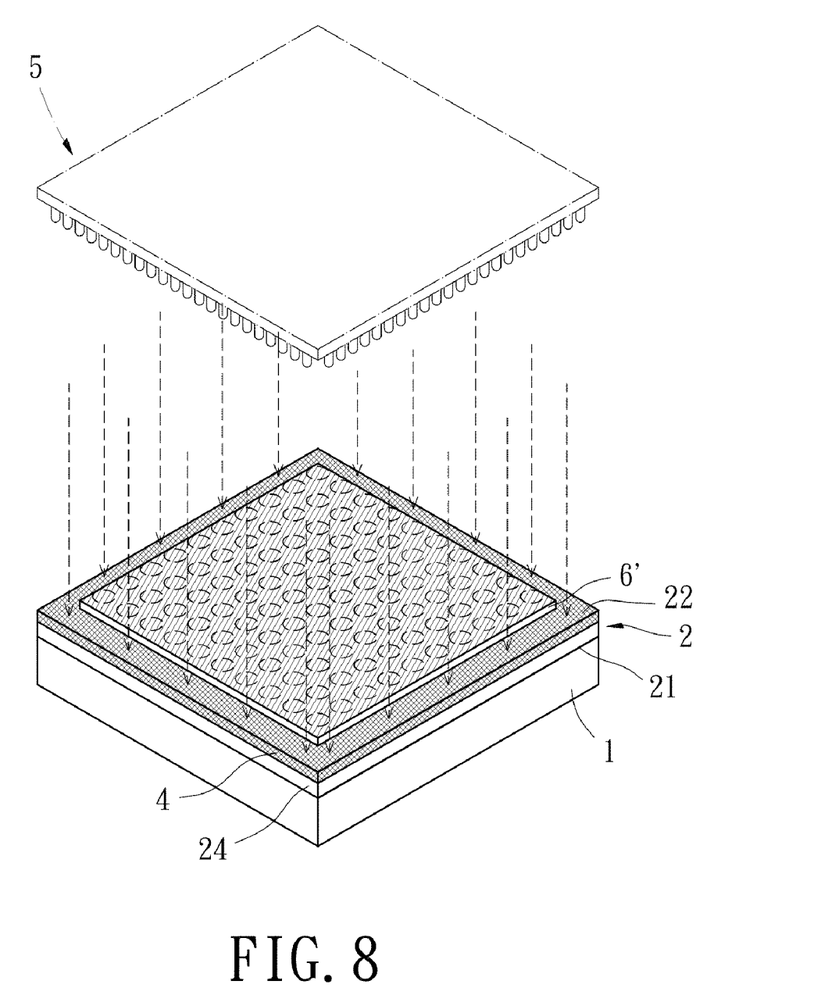
FIG. 8 is a schematic planar view of a peripheral exposure procedure in accordance with the present invention.
Figure 9:
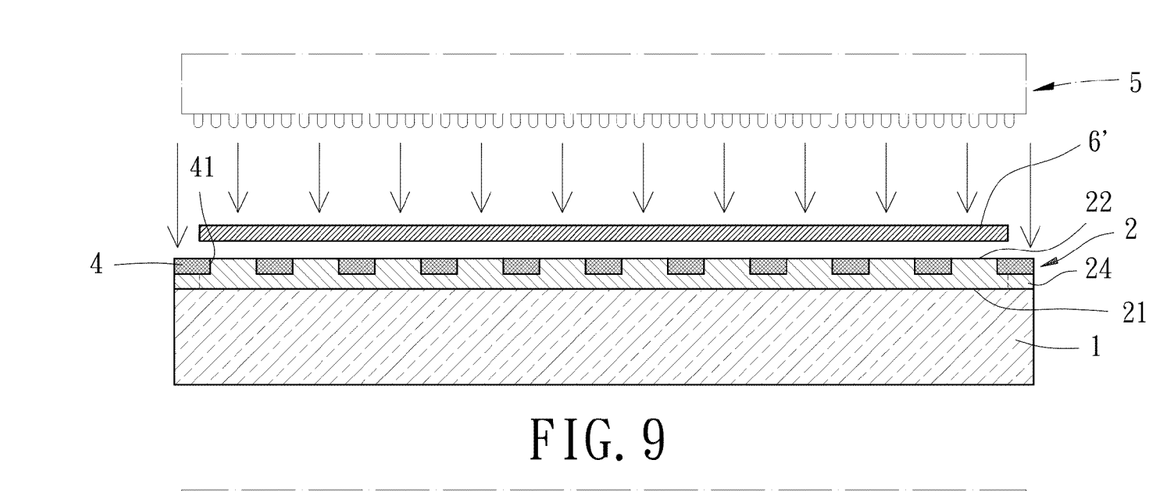
FIG. 9 is a schematic planar view of a peripheral exposure procedure in accordance with the present invention.
Figure 10:
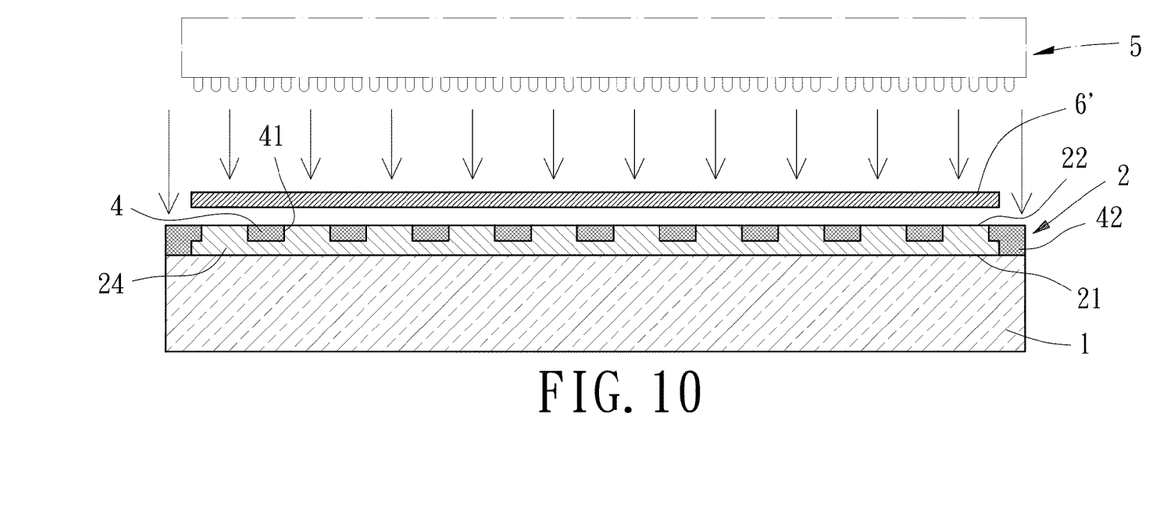
FIG. 10 is a schematic planar view of a peripheral exposure procedure in accordance with the present invention.

With reference to FIGS. 1 and 8 to 10, a peripheral exposure procedure S3*a* is performed, wherein the periphery of the second surface 22 of the polymer film 2 is exposed, so that a sidewall 42 is formed at the periphery of the mold layer 4. More specifically, the exposure light source 5 and a second mask 6' for shielding light are used for performing an exposure to a second surface 22 of the polymer film 2 as shown in FIG. 8, wherein the second mask 6' has an area smaller than that of the second surface 22, and the second mask 6' has a light shielding range covering the area with distributed through holes 41, so that only the periphery of the second surface 22 is exposed, and the peripheral is exposed with an exposure level reaching the first surface 21. In this preferred embodiment, the exposure dose for the thickness 500μm of the SU-8 polymer film 2 is equal to 3000 mJ/cm2 for the exposure to form the sidewall 42 of the mold layer 4 and restrict the mobility area of the heated polymer material during the manufacturing procedure that follows.

Figure 11:
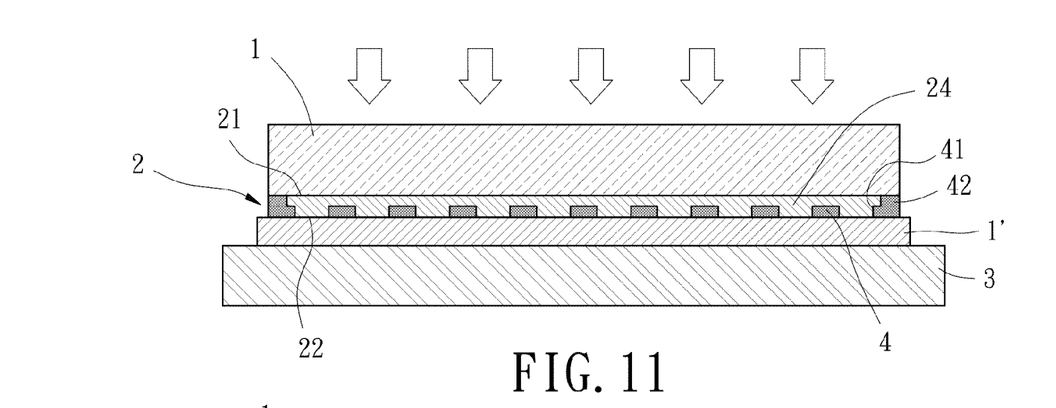
FIG. 11 is a schematic planar view of a transprint procedure in accordance with the present invention.
Figure 12:
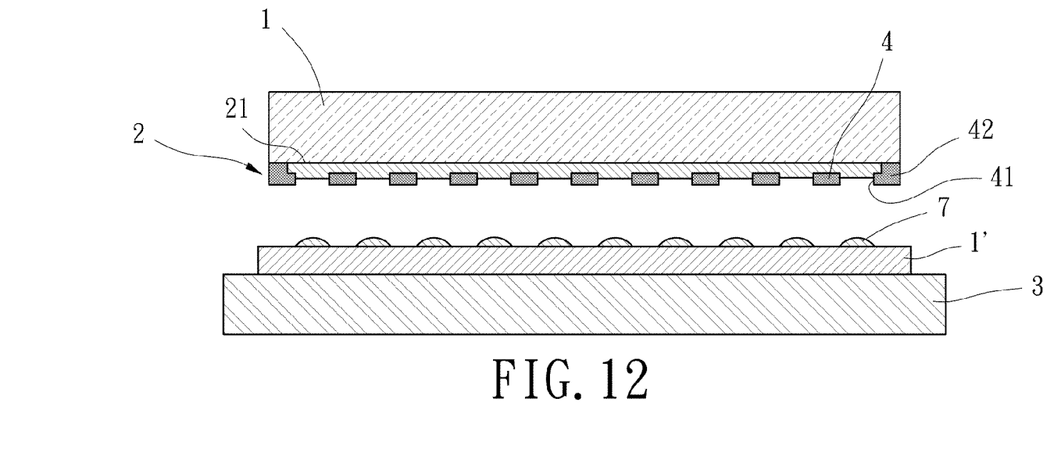
FIG. 12 is a schematic view of forming a microlens in accordance with the present invention.

With reference to FIGS. 1, 11 and 12, a transprint procedure S4 is performed, wherein a second substrate 1' is heated to an appropriate working temperature higher than the glass transition temperature of the photosensitive polymer for converting the unexposed photosensitive polymer from a solid state into a liquid state, and then the mold layer 4 and the second substrate 1' are pressed and abut on each other for the melted and unexposed photosensitive polymer in the polymer film 2 to flow onto the second substrate 1' through the through holes 41, and some of the unexposed photosensitive polymer are attached onto a surface of the second substrate 1' to form a plurality of microlenses 7. More specifically, as shown in FIG. 11, the mold layer 4 is placed upside down and used as a coining die, and the unexposed photosensitive polymer of the polymer film 2, which is contained by the sidewall 42 of the mold layer 4, is used as a pressing ink. The mold layer 4 is pressed and abuts on the second substrate 1' along a direction perpendicular to the surface of the second substrate 1'. The second substrate 1' is heated by the heating plate 3, such that after the mold layer 4 is in contact with the second substrate 1', the unexposed photosensitive polymer is heated to the working temperature through thermal conduction. A uniform pressure is applied to the liquid photosensitive polymer, so that the liquid photosensitive polymer passes through the through holes 41 and reaches and attaches onto the second substrate 1'. Finally, the mold layer 4 is detached from the second substrate 1' along the direction perpendicular to the surface of the second substrate 1'. During the process of the mold layer 4 being separated gradually from the second substrate 1', the viscosity of the liquid photosensitive polymer drives the photosensitive polymer adhered onto the second substrate 1' to be pulled into a microlens structure.

In the transprint procedure S4 of the present invention, the mold layer 4 can be pressed and abut onto the second substrate 1' several successive times without the need to turn over the transprinted mold layer and feed material every time before the mold layer is transprinted again (as used in the conventional method of manufacturing microlens arrays). While a pressed surface of the mold layer 4, which faces the second substrate 1', is being pressed successively, the photosensitive polymer is filled through a surface other than the pressed surface of the mold layer 4, so as to proceed the transprinting process without interruption, and thus the invention can be applied for the successive pressing process for the production of the microlens array, thereby effectively improving manufacturing efficiency.

Figure 13:
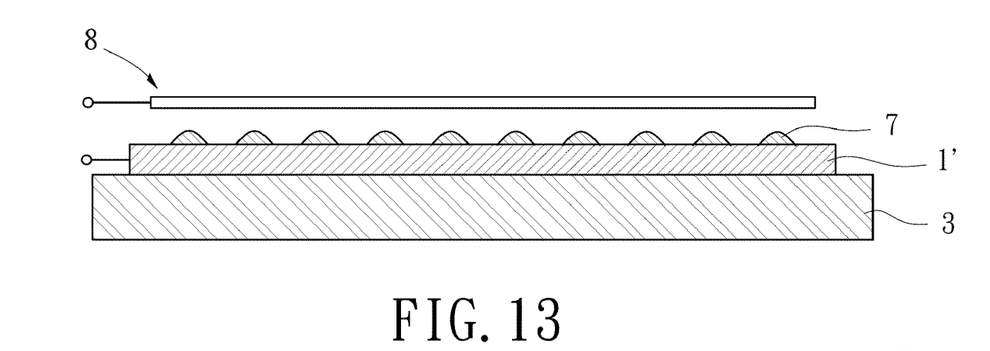
FIG. 13 is a schematic view of an adjusting procedure in accordance with the present invention.
Figure 16:
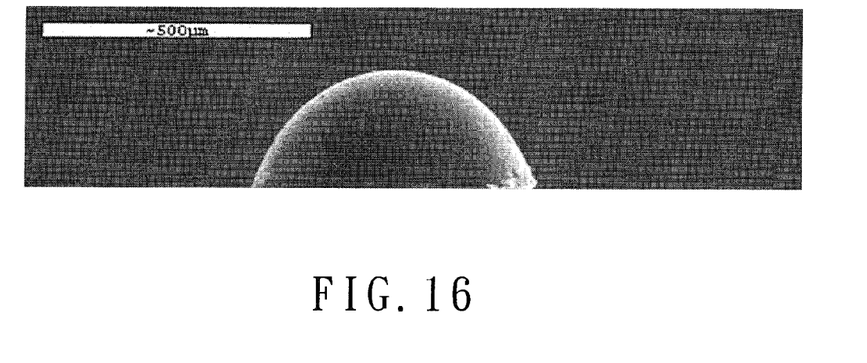
FIG. 16 shows a side view of microlens before the adjusting procedure takes place.
Figure 17:
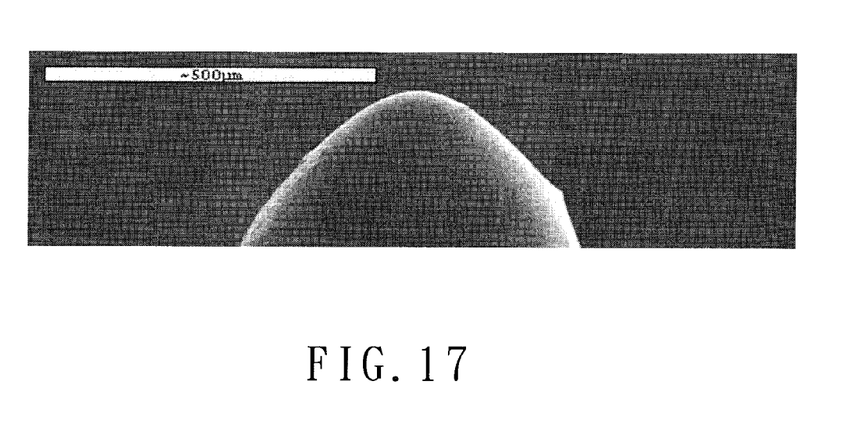
FIG. 17 shows a side view of microlens after the adjusting procedure takes place through an electric field.

With reference to FIGS. 1, 12 and 13, an adjusting procedure S4*a* is performed, wherein after the mold layer 4 is removed, the microlens substrate is heated to increase the material mobility of the microlens, and the temperature can be adjusted to control the surface tension of the microlens material and form a plurality of microlenses 7 with each microlens 7 having a predetermined curvature. In the meantime, the microlens substrate is heated also to eliminate uneven stress from occurring during the mold release process, so as to improve the uniformity of the microlenses 7. Besides, when the adjusting procedure S4*a* is performed, an electric field 8 can be applied. Preferably, the second substrate 1' is of electrically conductive material and connected to an electrode of a power supply for the microlens 7 on the second substrate 1' to be electrically charged, while another electrode of the power supply is disposed at a predetermined distance from the top of the microlens 7 to form the electric field 8 between the two electrodes. Alternatively, instead of connecting to the second substrate 1', the electrode below the microlens 7 can also be arranged lower than the second substrate 1' to build the electric field 8. Hence, static electricity disposed on the microlens 7 and generated by the effect of the electric field 8 enhances the precision of the curvature of the microlens 7 as shown in FIGS. 16 and 17. Finally, the microlens substrate is cooled to a temperature below the glass transition temperature of the photosensitive polymer.

Figure 14:
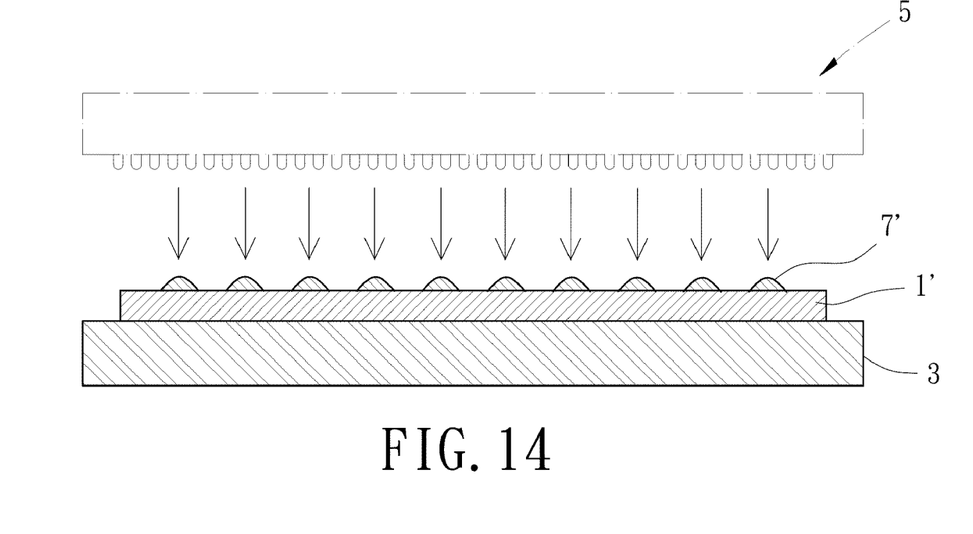
FIG. 14 is a schematic planar view of a solidification procedure in accordance with the present invention.

With reference to FIGS. 1 and 14, a solidification procedure S5 is performed, wherein the plurality of preliminarily shaped microlenses 7 are exposed, such that the plurality of microlenses 7 are solidified to form a finished microlens 7'. More specifically, the exposure dose of the exposure light source 5 set to 2000 mJ/cm2 is used for projecting the plurality of preliminarily shaped microlenses 7, so that the photosensitive polymer in the microlens 7 can be bonded and solidified to form the finished microlens 7', and a deformation of the finished microlens 7' caused by a rise of temperature can be avoided, so as to complete manufacturing the microlens array.

Figure 18:
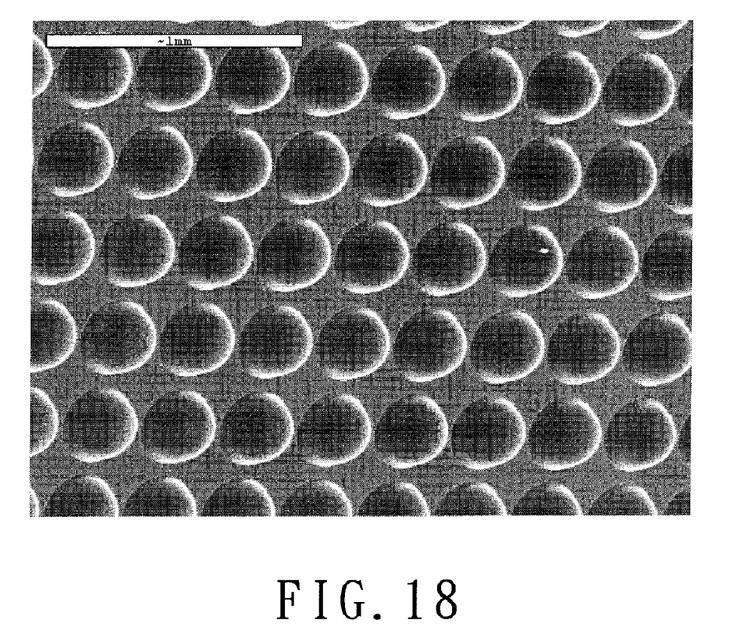
FIG. 18 shows results of a microlens (with a hole diameter of 300μm) manufactured by the present invention and observed through a scan electronic microscope.
Figure 19:
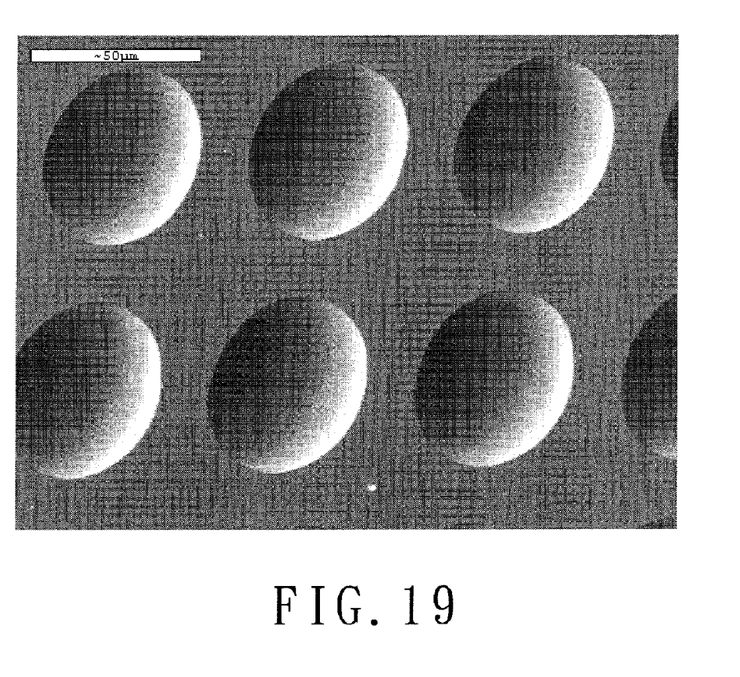
FIG. 19 results of a microlens (with a hole diameter of 50μm) manufactured by the present invention and observed through a scan electronic microscope.

With reference to FIGS. 18 and 19 for results of a microlens manufactured by the method of manufacturing a microlens array in accordance with the present invention and observed through a scan electronic microscope (SEM), the results show that the invention can be used for manufacturing uniform microlens arrays. The working temperatures of the microlens arrays as shown in FIGS. 18 and 19 are 70° C., and the diameters of the through holes 41 are 300μm and 50μm respectively. Accordingly, it is proved that a high uniformity can be achieved through the microlens arrays manufactured in accordance with the present invention.

Figure 15:
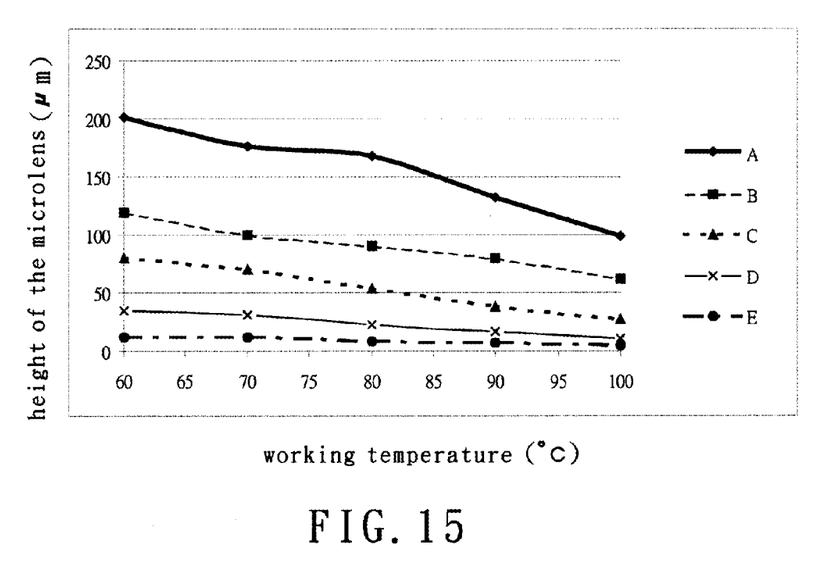
FIG. 15 is a schematic view of a change of height of manufactured microlenses with respect to the working temperature.

With reference to FIG. 15 for a schematic view of a change of height of the manufactured microlenses with respect to the working temperature, the diameters of the through holes 41 of the mold layer 4 in A, B, C, D, and E modules are 500, 300, 200, 100 and 50 μm respectively. The result shows that the height of the microlens decreases as the working temperature increases, and the present invention can control the working temperature to adjust the curvature of the microlens 7.

In summation of the description above, the present invention uses the surface exposure procedure S3 perform an exposure to the polymer film 2, so that the polymer film 2 forms a mold layer 4 having a plurality of through holes 41 on the surface of the polymer film 2, wherein only a simple manufacturing process to manufacture the mold layer 4 for the use as a coining die is required in the present invention. In addition, the invention will not cause any waste of photosensitive polymer, and thus can lower the manufacturing cost effectively, and the mold layer 4 can be used for successive presses. Besides, the photosensitive polymer can be filled continuously from another side of the mold layer 4 and used as the pressing ink without interrupting the transprint operation, and thus the invention can be effectively applied in a continuous production of microlens arrays and improve the manufacturing efficiency.

While the present invention has been described in connection with what is considered the most practical and preferred embodiment, it is understood that the invention is not limited to the disclosed embodiments but is intended to cover various arrangements included within the spirit and scope of the broadest interpretation and equivalent arrangements.

What is claimed is:

1. A method of manufacturing a microlens, comprising:
   a coating procedure coating a photosensitive polymer onto a surface of a first substrate to form a polymer film having a first surface in contact with the surface of the first substrate and a second surface;
   a soft bake procedure heating the polymer film;
   a surface exposure procedure exposing the second surface of the polymer film to a light source with an exposure level not reaching the first surface to define an exposed area and an unexposed area of the polymer film, with a mold layer being formed in the exposed area and at least one through hole of the mold layer being formed in the unexposed area;
   a transprint procedure pressing and abutting the mold layer onto a second substrate and heating the photosensitive polymer in the unexposed area to a temperature higher than a glass transition temperature of the photosensitive polymer for the photosensitive polymer in the unexposed area to be melted and flow through the at least one through hole, attach onto the second substrate, and form at least one microlens on a surface of the second substrate; and
   a solidification procedure performing an exposure to the at least one microlens and solidifying the at least one microlens to form the finished microlens.

2. The method of manufacturing a microlens of claim 1, further comprising a peripheral exposure procedure between the surface exposure procedure and the transprint procedure, and the peripheral exposure procedure performing an exposure to a periphery of the second surface of the polymer film, with the exposure having an exposure level reaching the first surface of the polymer film to form a sidewall.

3. The method of manufacturing a microlens of claim 1, wherein the surface exposure procedure controls the quantity of the agent of an exposure light source for the exposed area to have a thickness substantially equal to 40% to 60% of the overall thickness of the polymer film.

4. The method of manufacturing a microlens of claim 1, wherein a uniform pressure is applied to the melted photosensitive polymer in the transprint procedure after the photosensitive polymer in the unexposed area is heated to the temperature higher than the transferring glass temperature of the photosensitive polymer and before the melted photosensitive polymer passes through the at least one through hole and attaches onto the second substrate.

5. The method of manufacturing a microlens of claim 1, wherein the polymer film is heated to a temperature higher than the glass transition temperature in the soft bake procedure.

6. The method of manufacturing a microlens of claim 5, wherein the polymer film is cooled to a temperature lower than the glass transition temperature of the photosensitive polymer after the polymer film is heated in the soft bake procedure and before the surface exposure procedure is performed.

7. The method of manufacturing a microlens of claim 1, further comprising an adjusting procedure after the transprint procedure and before the solidification procedure, wherein the adjusting procedure controls the curvature of the at least one microlens by heating.

8. The method of manufacturing a microlens of claim 7, wherein when the adjusting procedure is performed, an electric field is applied for changing the curvature of the at least one microlens.

9. The method of manufacturing a microlens of claim 1, wherein the surface exposure procedure forms a plurality of through holes to allow the formation of a plurality of microlenses after the transprint procedure.

10. The method of manufacturing a microlens of claim 1, wherein the at least one microlens is cooled to a temperature after the transprint procedure is completed and before the solidification procedure is performed.

11. The method of manufacturing a microlens of claim 10, wherein the temperature is lower than the glass transition temperature of the photosensitive polymer.

* * * * *